United States Patent
Dom et al.

(10) Patent No.: US 11,420,142 B2
(45) Date of Patent: *Aug. 23, 2022

(54) HOUSING OF A LIQUID SEPARATION DEVICE FOR SEPARATION OF A LIQUID FROM A GAS-LIQUID MIXTURE

(71) Applicant: ATLAS COPCO AIRPOWER, NAAMLOZE VENNOOTSCHAP, Wilrijk (BE)

(72) Inventors: Johan Dom, Wilrijk (BE); Benjamin Moens, Wilrijk (BE); Pieter-Jan Belles, Wilrijk (BE); Diego Truyen, Wilrijk (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 93 days.

This patent is subject to a terminal disclaimer.

(21) Appl. No.: 16/561,155

(22) Filed: Sep. 5, 2019

(65) Prior Publication Data

US 2020/0086251 A1 Mar. 19, 2020

Related U.S. Application Data

(60) Provisional application No. 62/731,178, filed on Sep. 14, 2018.

(30) Foreign Application Priority Data

Jan. 10, 2019 (BE) .................................. 2019/5012

(51) Int. Cl.
*B01D 35/26* (2006.01)
*B01D 29/00* (2006.01)
(Continued)

(52) U.S. Cl.
CPC ........... *B01D 35/26* (2013.01); *B01D 29/009* (2013.01); *B01D 29/56* (2013.01); *B01D 35/30* (2013.01); *B01D 19/0031* (2013.01)

(58) Field of Classification Search
CPC ............... F02M 37/32; F02M 37/0017; B01D 36/003; B01D 35/30; B01D 27/005;
(Continued)

(56) References Cited

U.S. PATENT DOCUMENTS

2004/0208771 A1 10/2004 Ohsumimoto et al.
2005/0217221 A1 10/2005 Stickland et al.
(Continued)

FOREIGN PATENT DOCUMENTS

| KR | 1020120014112 A | 2/2012 |
| WO | 2013121257 A1 | 8/2013 |
| WO | 2018134758 A2 | 7/2019 |

*Primary Examiner* — Madeline Gonzalez
(74) *Attorney, Agent, or Firm* — Bacon & Thomas, PLLC

(57) ABSTRACT

A housing of a liquid separation device that includes an inlet for the gas-liquid mixture and a set of integrated components, the set of integrated components includes a liquid separator vessel to separate liquid from the gas-liquid mixture, and the liquid separator vessel includes an entry port for the gas-liquid mixture, a liquid outlet port, and a gas outlet port. The set of integrated components includes a set of channels, where a wall of each channel is part of the housing, where the set of channels includes an inlet channel to guide the gas-liquid mixture from the inlet to the entry port and an outlet channel to guide gas from the gas outlet port away from the liquid separator vessel. The housing includes at least two opposite housing pieces which can be hermetically sealed together along a sealing line which is situated in a sealing face.

25 Claims, 5 Drawing Sheets

(51) Int. Cl.
*B01D 35/30* (2006.01)
*B01D 29/56* (2006.01)
*B01D 19/00* (2006.01)

(58) Field of Classification Search
CPC ...... B01D 27/00; B01D 29/00; B01D 35/306;
B01D 2201/34; B01D 2201/4046; B01D
2201/4061; B01D 35/26; B01D 29/009;
B01D 29/56; B01D 19/0031; B01D
46/0039; B01D 46/0002; B01D 46/0031;
B01D 2201/30; B01D 19/00; B01D
35/14; B01D 46/0001; B01D 46/003;
B01D 46/0087; B01D 45/00–16; B01D
2260/609; B01D 19/0042–0057; F04B
39/062; F04B 39/16; F04B 39/02; F04D
31/00; F05D 2260/605; F01M 13/04;
F01M 13/0494

USPC ....... 210/435, 150, 188, 180, 175, 455, 472;
55/421, 434–465; 96/188–192, 241–266,
96/155–220; 95/267–272
See application file for complete search history.

(56) References Cited

U.S. PATENT DOCUMENTS

| | | |
|---|---|---|
| 2006/0083650 A1 | 4/2006 | Sowards |
| 2011/0315018 A1 | 12/2011 | Moens |
| 2015/0023825 A1* | 1/2015 | Mietto .................... F04C 2/16 418/205 |
| 2015/0152763 A1* | 6/2015 | Sugio .................... B01D 45/08 55/385.3 |
| 2017/0356447 A1 | 12/2017 | Kraus et al. |
| 2018/0030868 A1* | 2/2018 | Elsaesser ............. F04D 29/706 |

* cited by examiner

HOUSING OF A LIQUID SEPARATION DEVICE FOR SEPARATION OF A LIQUID FROM A GAS-LIQUID MIXTURE

CROSS REFERENCE TO RELATED APPLICATIONS

This application claims the benefit of provisional application 62/731,178, filed Sep. 14, 2018, and Belgium application BE 2019/5012, filed Jan. 10, 2019, which are incorporated herein by reference.

The present invention concerns a housing of a liquid separation device for separation of a liquid from a gas-liquid mixture.

In particular, the invention concerns a housing of a liquid separation device comprising an integrated liquid separation vessel as part of the housing for separating liquid from a gas compressed by means of a liquid-injected compressor or vacuum pump element.

BACKGROUND

It is known that, for such a compressor or vacuum pump element, liquid is injected into a compression chamber of the compressor or vacuum pump element to lubricate, cool and/or seal one or more rotors contained in this compression chamber.

This liquid is mixed with the gas drawn into the compression chamber, and is discharged together with the compressed gas from the compressor or vacuum pump element.

In a liquid separator downstream the liquid-injected compressor or vacuum pump element, liquid needs to be separated from the gas-liquid mixture discharged from such a liquid-injected compressor or vacuum pump element to supply a consumer or consumer network with basically liquid-free compressed gas or compressed gas with at least a significantly reduced liquid content.

The separated liquid is then recovered and redirected from the liquid separator to the liquid-injected compressor or vacuum pump element in order to be reinjected into the compression chamber.

Typically, the liquid separator is a unit comprising a vessel separate from the liquid-injected compressor or vacuum pump element, whereby the vessel is configured to separate and store liquid from the gas-liquid mixture.

An inlet of the liquid separator is coupled to an outlet for the compressed gas-liquid mixture of the liquid-injected compressor or vacuum pump element by means of a conduit. An outlet for liquid-free or low-liquid gas of the liquid separator is connected either to a consumer network or application, or to additional downstream equipment units to further treat the liquid-free or low-liquid gas.

Examples of separate liquid separators according to the prior art may, for instance, be found in WO 2018/134758.

These prior art liquid separators, however, show some specific disadvantages.

A first disadvantage lies in the considerable overall dimensions of the liquid separator, in particular due to the size of the vessel.

For instance, in case the liquid injected into the compression chamber is oil, this oil is subject to relatively rapid degradation by oxidation due to substantial heat generated in the compressor or vacuum pump element upon compression of the gas. For this reason, the volume of oil maintained in a compressor or vacuum pump installation and, consequently the size of the tank, should be kept as large as possible in order to decrease the ratio of contact surface between oil and gas with respect to this volume of oil. In this way, frequency of oil replacements may be decreased, such that down times of the compressor or vacuum pump installation for oil replacement are reduced.

If the size of the liquid separator tank is reduced without lowering the volume of liquid contained in the compressor or vacuum pump installation, such that a liquid filling level of the liquid separator vessel increases, a risk of liquid entrainment from the liquid in the liquid separator vessel to the obtained liquid-low or liquid-free gas occurs due to turbulences in this liquid and at the contact surface between liquid and gas, as a result of vigorous entry of the gas-liquid mixture in the liquid separator tank, possible pressure fluctuations in the liquid separator tank, and/or vigorous evacuation of liquid from the liquid separator tank.

A second disadvantage is constituted by the considerable number of components in the overall compressor or vacuum pump installation comprising a separate liquid separator, mainly due to the number of conduits to connect different equipment units downstream the compressor or vacuum pump element, among which the liquid separator.

In addition, pressure drops over the conduits increase with the number of bends and the length of these conduits.

Finally, the conduits are typically the weakest components of the overall compressor or vacuum pump installation with respect to mechanical strength, corrosion and leak-tightness, in particular at locations where the conduits fit onto the different equipment units, implying specific requirements with respect to sealing and isolation of these conduits.

When the conduit between the compressor or vacuum pump element and the liquid separator of the compressor or vacuum pump installation does not securely connect these two components as a single unit, it may be difficult to safely move the compressor or vacuum pump installation as one, implying that the compressor or vacuum pump installation should be disassembled into all its components upon transport.

For these reasons, there is a need to bring the compressor or vacuum pump element and further downstream equipment units, such as components of a compressor or vacuum pump installation, closer together in space, or even to integrate functions of these components in a more limited number of parts with respect to the number of parts required in conventional compression installations in which all components are separated in space.

For instance, compressor or vacuum pump installations have been developed integrating the liquid-injected compressor or vacuum pump element and the liquid separator in one common housing comprising a body composed of one single block.

Examples of this kind of integrated compressor or vacuum pump installation are, for example, known from EP 2 820 307.

However, integrating both compressor or vacuum pump element and liquid separator in one common housing reduces a general modularity and flexibility in the assembly of the compressor or vacuum pump installation as the compressor or vacuum pump element and liquid separator cannot be detached and separated from each other.

This poses some limitations on an adjustment of the liquid separator dimensions to a load and associated liquid requirements of the compressor or vacuum pump element, a possibly compulsory adaptation of the liquid separator to perform according to more stringent governmental regulations, and/or a replacement of only one of the liquid separator or compressor or vacuum pump element when one of these components fails or breaks down.

In addition, the integration of too many components of the compressor or vacuum pump installation in one small common housing composed of one single block may reduce accessibility of the components in the housing, and consequently the serviceability of these components.

Furthermore, the compressor or vacuum pump element with its shape and position is often fixed as one of the first components into the housing block, since this shape is determined by the rotors contained in this compression chamber. As a result, space in the housing block remaining after the fixation of the shape and position of the compressor or vacuum pump element in the housing block is applied to fix the position and shape of the liquid separator, often leading to a non-symmetric internal shape of the liquid separator vessel as illustrated by the liquid separator vessel in EP 2 820 307, resulting in a nonoptimal separation of liquid from the gas-liquid mixture in the liquid separator vessel.

Finally, the integration of many components in one small common housing composed of one single block may pose significant challenges for the manufacturing of the housing, requiring the use of advanced techniques such as additive manufacturing.

SUMMARY OF THE INVENTION

The purpose of the present invention is to provide a solution to one or more of the aforementioned and/or other disadvantages.

To this end, the invention concerns a housing of a liquid separation device for separation of a liquid from a gas-liquid mixture,
whereby the housing comprises an inlet for the gas-liquid mixture and a set of integrated components,
whereby the set of integrated components comprises a liquid separator vessel configured to separate liquid from the gas-liquid mixture,
whereby the liquid separator vessel comprises an entry port for the gas-liquid mixture, a liquid outlet port, and a gas outlet port,
whereby the set of integrated components further comprises a set of channels, whereby a wall of each channel is part of the housing,
whereby the set of channels comprises
  an inlet channel configured to guide the gas-liquid mixture from the inlet of the housing to the entry port of the liquid separator vessel; and
  an outlet channel configured to guide gas from the gas outlet port away from the liquid separator vessel,
with the characteristic that the housing comprises at least two opposite housing pieces which are configured to be hermetically sealed together along a sealing line which is situated in a sealing face.

By 'opposite housing pieces' is meant that the housing pieces are essentially positioned at opposite sides of the sealing face.

An advantage of the housing according to the invention is that the number of components in the overall compression installation is reduced by eliminating the need for separate inlet and outlet conduits to connect the liquid separator with the compressor or vacuum pump element respectively the consumer network/application or additional downstream equipment to further treat the purified gas-liquid mixture obtained from the liquid separator.

As the inlet and outlet channels are integrated as solid channels whereby the wall of these channels is part of the housing according to the invention, they are better protected against external environmental impact factors, providing the overall compressor or vacuum pump installation with additional mechanical strength and making the compressor or vacuum pump installation less corrosion- and/or leak-prone.

In addition, the integrated channels may be arranged in such a way that they segue seamlessly into the liquid separator vessel, avoiding leak-prone fittings that are needed to fix conventional non-integrated conduits onto the liquid separator vessel.

As an additional advantage, the integrated channels may be arranged in the housing in such a way that they are as short as possible and exhibit as few bends as possible, in order to avoid excessive pressure drops and to achieve an optimal reduction of the size of the overall compressor or vacuum pump installation.

The composition of the housing in at least two opposite housing pieces facilitates the manufacturing of this housing, even when the housing contains a multitude of components possibly with complex and/or irregular shapes, by means of conventional manufacturing techniques such as injection moulding.

As an additional advantage, the components contained in the housing are more easily accessible and, consequently, maintained and/or replaced after the housing is opened by separating the at least two opposite housing pieces along the sealing face, which sealing face is preferably a plane.

In a preferred embodiment of the housing according to the invention, the set of integrated components in the housing further comprises a liquid storage reservoir, which liquid storage reservoir is configured such that it is able to store liquid leaving the liquid separator vessel through the liquid outlet port of the liquid separator vessel.

The advantage that lies in the integration of the liquid storage reservoir in the housing according to this preferred embodiment, is a further reduction of the overall size of the compressor or vacuum pump installation.

Additionally, the liquid stored in the liquid storage reservoir is separated from liquid in the liquid separator vessel by means of a wall of the liquid separator vessel and is only in fluid connection with said liquid in the liquid separator vessel through the liquid outlet port of the liquid separator vessel.

As the wall of the liquid separator vessel acts as a kind of baffle between the liquid in the liquid separator vessel and the liquid in the liquid storage reservoir, said liquid in the liquid storage reservoir is less subject to turbulences in the liquid in the liquid separator vessel which may be caused by a vigorous entry of the gas-liquid mixture through the entry port in the liquid separator vessel and/or pressure fluctuations in the liquid separator vessel. In this way, excessive entrainment of liquid droplets with the purified gas-liquid mixture leaving the liquid separator vessel through the gas outlet port may be significantly reduced or even avoided.

The liquid storage reservoir is also easy to integrate into the housing as it does not require a symmetrically or regularly shaped internal space, such that it may be fitted into the housing into the space remaining after integration of other integrated components requiring such a regularly shaped internal space, such as the liquid separator vessel and/or the set of integrated channels.

Furthermore, the liquid storage reservoir permits to increase the volume of liquid in a compressor or vacuum pump installation with a liquid-injected compressor or vacuum pump element. In this way, possible degradation of the liquid is reduced due to a decrease in the ratio of contact surface between the gas-liquid mixture and the liquid with respect to the volume of liquid in the housing, such that the frequency of liquid replacements may be reduced.

As a more preferred embodiment of the housing according to the invention comprising a liquid storage reservoir, an internal wall of the liquid storage reservoir comprises a recess configured to contain a heater.

The heater may preheat liquid in the liquid storage reservoir before start-up of the compressor or vacuum pump installation to bring the temperature of the liquid in the oil reservoir to a specific pre-determined value, such that this start-up is smoother and faster.

Preferably, the set of integrated components comprises a liquid buffer tank, which liquid buffer tank is at least partly separated from the liquid separator vessel by means of a wall of the liquid separator vessel, and which liquid buffer tank is configured such that liquid in the liquid separator vessel may flow in the liquid buffer tank and vice versa through an opening in said wall of the liquid separator vessel.

Integration of such a liquid buffer tank into the housing confers the same advantages as the integration of the liquid storage reservoir and may further increase the volume of liquid in the housing.

In order to further separate trace amounts of liquid from the gas obtained in the liquid separator vessel, a liquid separation filter may be used in the compressor or vacuum pump installation.

In a preferred embodiment of the invention, the liquid separator contains an internal liquid separation filter.

Integrated incorporation of this internal liquid separation filter into the liquid separator vessel may bring the advantage of a further reduction of the overall size of the compressor or vacuum pump installation.

As a more preferred embodiment of the invention, the set of channels integrated into the housing may comprise a scavenge channel which is configured to guide liquid separated in the internal liquid separation filter away from the liquid separator vessel.

The advantages of the integration of this scavenge channel are the same as for the integration of the inlet and outlet channels.

In a preferred embodiment of the invention, the set of integrated components of the housing comprises a supporting seat which is configured to be connected to the outlet channel and to accommodate an external liquid separation filter configured to further separate liquid from the gas-liquid mixture.

In this way, filter capacity of the compressor or vacuum pump installation may be established and/or increased in a flexible way, as the external liquid separation filter may be mounted and/or demounted easily into the supporting seat, such that the external liquid separation filter is easy to maintain and/or easily adaptable in size.

As a preferred embodiment of the invention, the set of integrated components of the housing comprises a fitting configured to connect a blow-off valve, a fitting configured to connect a safety valve, a casing configured to contain a minimum pressure valve, a casing configured to contain a thermostatic valve, and/or a supporting seat which is configured to accommodate a liquid filter configured to filter the liquid from impurities.

The integration of these components into the housing may further reduce the size of the overall compressor or vacuum pump installation and/or the number of separate conduits connecting these components.

In a more preferred embodiment of the housing according to the invention comprising a casing configured to contain a thermostatic valve and a supporting seat configured to accommodate a liquid filter, the set of channels integrated into the housing comprises a connection channel configured to connect the casing configured to contain the thermostatic valve with the supporting seat configured to accommodate the liquid filter.

In a more preferred embodiment of the housing according to the invention comprising a supporting seat configured to accommodate a liquid filter, the set of channels comprises a drainage channel configured to drain liquid filtered from impurities in the liquid filter away from the liquid filter.

The advantages of the integration of this connection and/or drainage channel are the same as for the integration of the inlet and outlet channels into the housing.

As a preferable embodiment of a housing according to the invention comprising at least two opposite housing pieces, a channel or preferably several channels in the set of channels are cut along the sealing face over a distance of more than 50%, preferably more than 60%, more preferably more than 70%, even more preferably more than 80%, yet more preferably more than 90% of a length of said channel.

By 'distance over which a channel is cut', it is meant the largest straight-line dimension of the cut through the channel.

The advantage of this more preferred embodiment is that the involved channel is cut over a significant portion of its length, resulting in a straightforward and extensive access to the channel, such that the channel may be easily maintained. Hereby, the length of a channel is measured along a line connecting all centres of gravity of any transversal cuts through the channel.

In order to provide enough space to apply a sealant along the sealant line along which the at least two opposite housing pieces may be hermetically sealed, at least one of these at least two opposite housing pieces may be provided with a groove along the sealant line.

To provide enough sealant along the complete sealing line, the groove is preferably a continuous groove.

As an even more preferable embodiment of the housing according to the invention comprising at least two opposite housing pieces and whereby at least one of the at least two opposite housing pieces is provided with a groove along the sealing line, at least one of the at least two opposite housing pieces opposite to the at least one of the at least two opposite housing pieces provided with the groove, is provided with a protrusion along the sealing line, which protrusion is configured to fit into the groove.

In this way, the at least two opposite housing pieces may only be separated from each other in a direction which is essentially orthogonal onto the sealing face, such that the at least two opposite housing pieces cannot slide over each other along the sealing face. This provides the housing with more mechanical strength, while the at least two opposite housing pieces may still be separated from each other in an easy and straightforward way.

In a preferred embodiment of the invention, the liquid separator vessel of the housing comprises a detachable lid.

This facilitates insertion, maintenance, and/or replacement of an internal liquid separation filter contained in the liquid separator vessel when the lid is detached from the liquid separator vessel.

Furthermore, an internal volume of the liquid separator vessel may be decreased and/or increased in a straightforward way by mounting a lid of another size, in order to adjust the internal volume of the liquid separator vessel to the required liquid volume in the compressor or vacuum pump installation and/or a required liquid separation capacity of the liquid separator vessel.

As a preferred characteristic of the housing according to the invention, a channel in the set of channels integrated into the housing is essentially constant in diameter along a length of said channel.

This preferred characteristic confers the advantage that friction and consequently the pressure drop over the concerned channel are optimally reduced.

In a preferred embodiment of the invention, the liquid separator vessel comprises a concave internal surface which is cyclic symmetric.

In a more preferred embodiment of the invention, the gas outlet port of the liquid separator is arranged along an axis around which the concave internal surface of the liquid separator vessel is cyclic symmetric.

Accordingly, the separation of liquid from the gas-liquid mixture is optimized by the internal geometry of the liquid separator vessel by means of the creation of a liquid-separating vortex in the liquid separation vessel which axis essentially coincides with the axis around which the concave internal surface is cyclic symmetric.

The invention also relates to a method to produce a housing of a liquid separation device for separation of a liquid from a gas-liquid mixture,
whereby the method comprises the step of including a set of integrated components which are part of the housing,
whereby the set of integrated components comprises a liquid separator vessel configured to purify the gas-liquid mixture by separating liquid from the gas-liquid mixture,
whereby the method further comprises the step of including into the set of integrated components a set of channels,
whereby a wall of each channel is part of the housing, with the characteristic that the method comprises the step of manufacturing the housing in at least two opposite housing pieces which may be hermetically sealed together along a sealing line which is situated in a sealing face.

This makes it possible that the method comprises the preferable step of injection moulding, preferably metal injection moulding, more preferably aluminium injection moulding.

The use of a conventional injection moulding technique to produce the housing is faster and less expensive than the use of more advanced techniques such as additive manufacturing.

Preferably, the method comprises the step of fastening the at least two opposite housing pieces together by means of a bolt connection, a glue connection, or a combination of both.

These kinds of connections confer the advantages of mechanical strength and leak-tightness to the housing.

As a preferred embodiment of the method to produce the housing according to the invention, the method comprises the step of providing the liquid separator vessel with a detachable lid.

Preferably, this detachable lid is fastened by means of a bolt connection, a screw connection, or a combination of both.

These kinds of connections confer the advantages of mechanical strength and leak-tightness to the liquid separator vessel.

BRIEF DESCRIPTION OF THE DRAWINGS

With the intention of better showing the characteristics of the invention, a few preferred embodiments of a housing and a method to produce a housing according to the invention, are described hereinafter by way of example, without any limiting nature, with reference to the accompanying drawings, wherein.

DETAILED DESCRIPTION OF THE INVENTION

Figure 1:
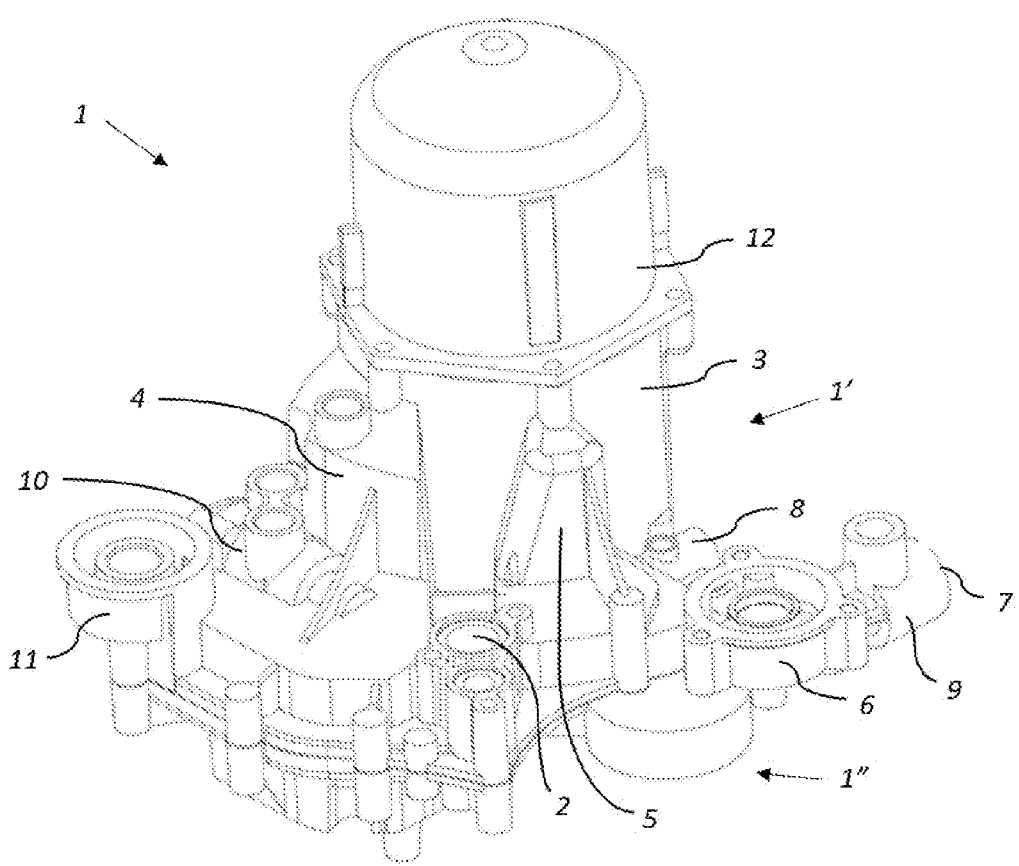
FIG. 1 shows a housing according to the invention.

The housing 1 in FIG. 1 is provided with an inlet 2 for the gas-liquid mixture.

A liquid separation vessel 3 is integrated as a component of the housing 1, which liquid separator vessel is configured to separate liquid from the gas-liquid mixture.

In this case, the housing 1 also comprises additional integrated components, such as
- a liquid storage reservoir 4, which is configured such that it is able to store liquid from the liquid separator vessel 3;
- a liquid buffer tank 5, which is partly separated from the liquid separator vessel 3 by means of a wall of the liquid separator vessel 3, and which is configured such that liquid in the liquid separator vessel 3 may flow into the liquid buffer tank 5 and vice versa through an opening in said wall of the liquid separator vessel 3;
- a supporting seat 6, which is configured to accommodate an external liquid separation filter configured to further separate liquid from purified gas coming from the liquid separator vessel 3;
- a fitting 7 configured to connect a blow-off valve, preferably provided downstream the supporting seat 6 to accommodate the external liquid separation filter;
- a fitting 8 configured to connect a safety valve;
- a casing 9 configured to contain a minimum pressure valve;
- a casing 10 configured to contain a thermostatic valve; and
- a supporting seat 11, which is configured to accommodate a liquid filter configured to filter the liquid from impurities.

The liquid storage 4 is, in this case, provided with a vent hole.

Two fittings are, in this case, also provided on the casing 10 for conduits in order to enable a connection between the thermostatic valve and an oil cooler. When the temperature of the liquid in the housing 1 becomes too high for a proper cooling of the liquid-injected compressor element, at least part of this liquid may be deflected via these conduits from the thermostatic valve to the oil cooler.

Liquid filtered from impurities in the liquid filter is guided to a liquid outlet of the housing 1, which is in this case positioned next to the inlet 2 of the housing 1. From this outlet, the liquid may flow into an injection circuit of a liquid-injected compressor element which is connected to this outlet.

The liquid separator vessel 3 of housing 1 is, in this case, also provided with a detachable lid 12.

Preferably, the housing 1 is composed of at least two opposite housing pieces 1',1" which are configured to be hermetically sealed together along a sealing line which is situated in a single sealing face.

Optionally, these two housing pieces 1',1" may be provided with additional mechanical strength by means of external reinforcing ribs.

Figure 2:
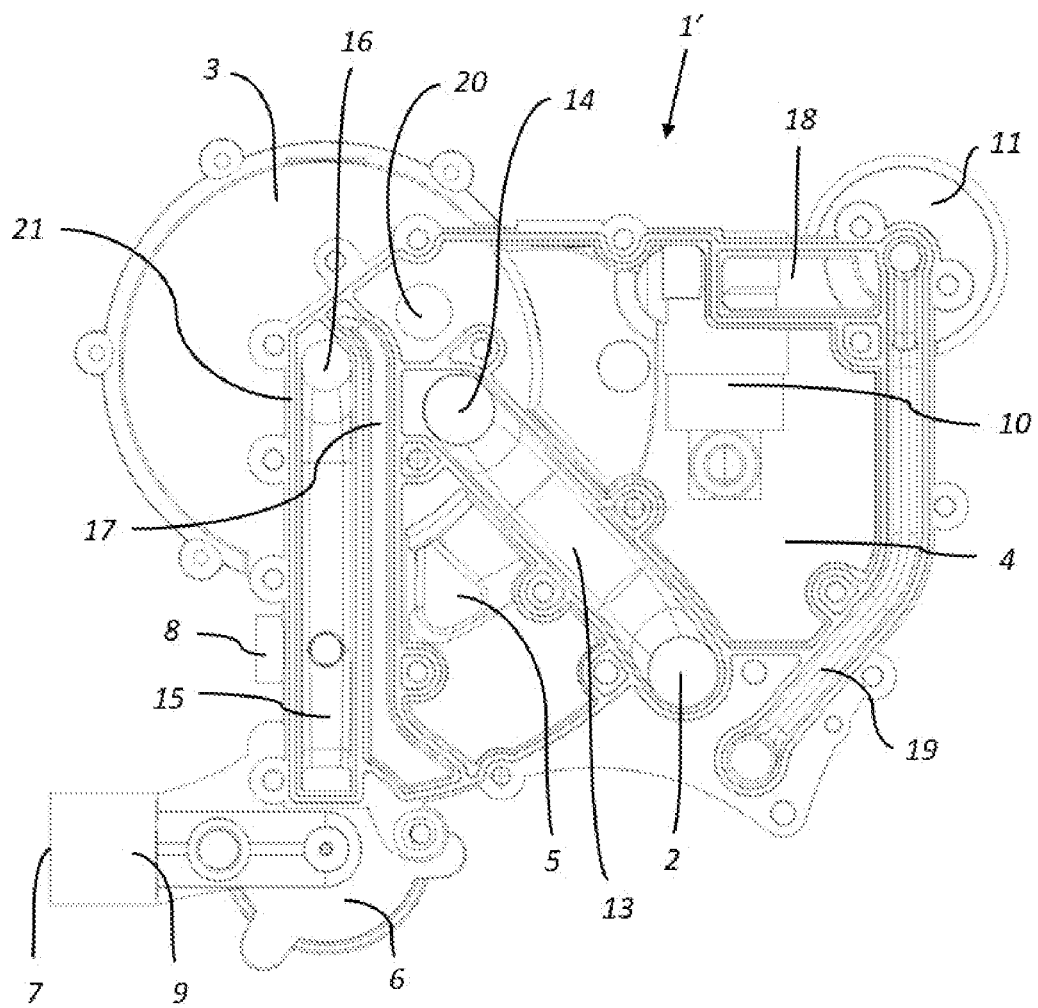
FIG. 2 shows an internal view of a housing piece along a cut through the housing in FIG. 1 according to the sealing face.

FIG. 2 shows an internal view of one of the at least two opposite housing pieces 1' along a cut through the housing 1 in FIG. 1 according to the sealing face.

In this case, a set of channels is visible whose wall is formed by the housing 1, whereby this set of channels comprises

- an inlet channel 13 configured to guide gas-liquid mixture from the inlet 2 of the housing 1 to an entry port 14 of the liquid separator vessel 3;
- an outlet channel 15 configured to guide purified gas-liquid mixture from a gas outlet port 16 of the liquid separator vessel 3 away from the liquid separator vessel 3;
- a scavenge channel 17 configured to guide liquid separated in the internal liquid separation filter away from the liquid separator vessel 3;
- a connection channel 18, which is configured to connect the casing 10 configured to contain the thermostatic valve with the supporting seat 11 configured to accommodate the liquid filter; and
- a drainage channel 19 configured to drain liquid filtered from impurities in the liquid filter away from the liquid filter and its supporting seat 11 to the liquid outlet of the housing 1.

From the internal view of housing piece 1', it becomes clear that the liquid storage reservoir 4 is in liquid connection with the liquid separator vessel 3 through a liquid outlet port 20 of the liquid separator vessel 3.

Liquid in the liquid storage reservoir 4 is guided to the thermostatic valve through a suction channel which is part of the casing 10.

The gas outlet 16 of the liquid separator vessel 3 is, in this case, arranged in the centre of the cylindrical liquid separator vessel 3 at the same side of the liquid separator vessel 3 as the liquid outlet port 20.

As can be seen in FIG. 2, the channels except the suction channel of casing 10 are longitudinally cut along the sealing face over a significant distance and essentially constant in diameter along their length.

The sealing line goes along an external wall of the housing 1 and is, in this case, partly contained in the wall of the channels.

This sealing line may be provided with a groove 21 to accommodate a sufficient amount of sealant by which the opposite housing pieces 1',1" may be hermetically sealed together.

Preferably, the groove 21 is a continuous groove to ensure that each point on the sealing line is provided with enough sealant in order to hermetically seal the housing pieces 1',1" together.

Figure 3:
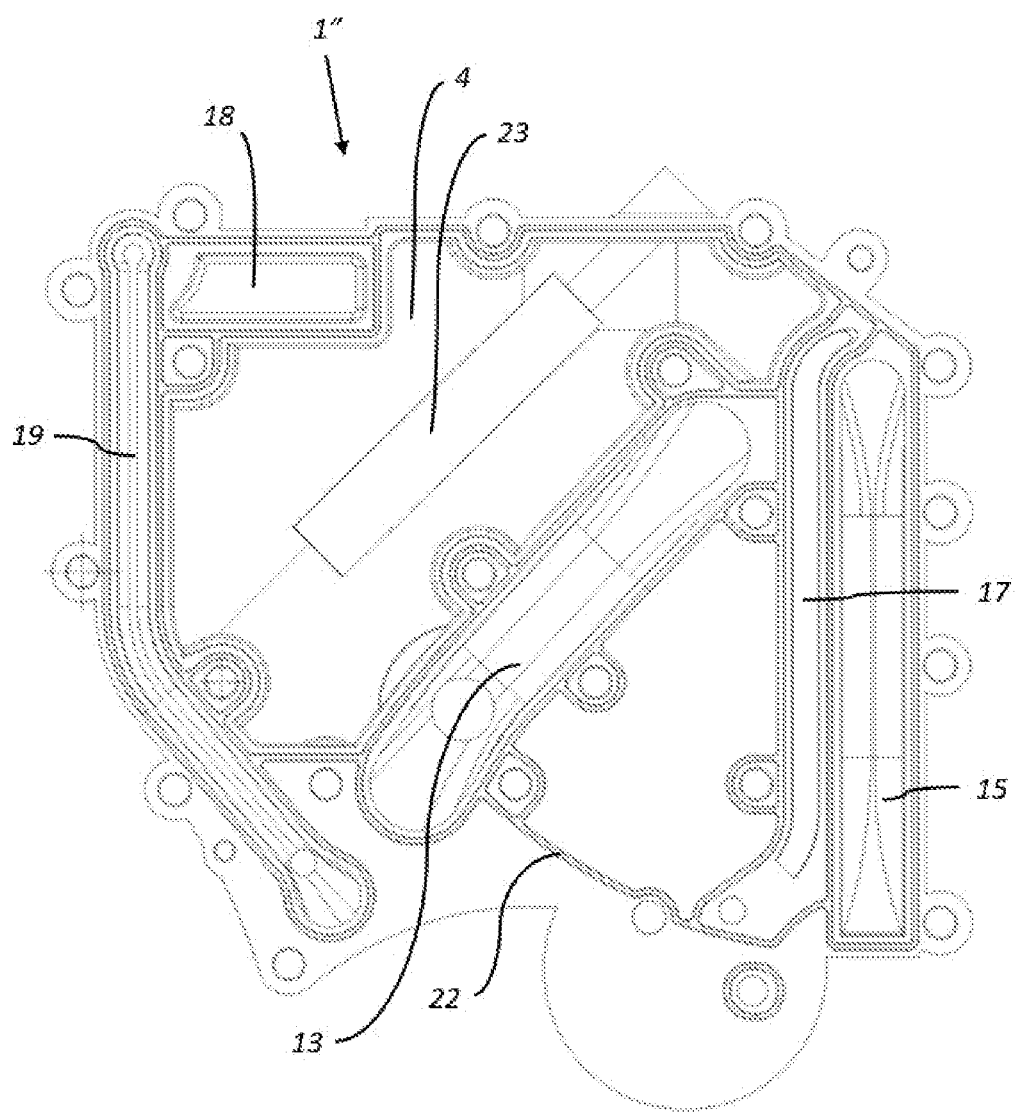
FIG. 3 shows an internal view of a housing piece opposite to the housing piece in FIG. 2 along the sealing face.

FIG. 3 shows an internal view of a housing piece 1" which is opposite to housing piece 1' in FIG. 2 according to the sealing face.

In this case, housing piece 1" is provided with a protrusion 22 along the sealing line, which protrusion 22 is configured to fit into the groove 21 of housing piece 1'.

It is not to be excluded that housing piece 1' is provided with a protrusion 22 and housing piece 1" with a groove 21.

It is also not to be excluded that housing piece 1' or 1" is provided with several grooves 21 and/or protrusions 22, whereby these protrusions 22 fit into corresponding grooves in housing piece 1" respectively 1'.

The internal view of housing piece 1" also shows a recess 23 in an internal wall of the liquid storage reservoir 4, which recess 23 is configured to contain a heater.

Figure 4:
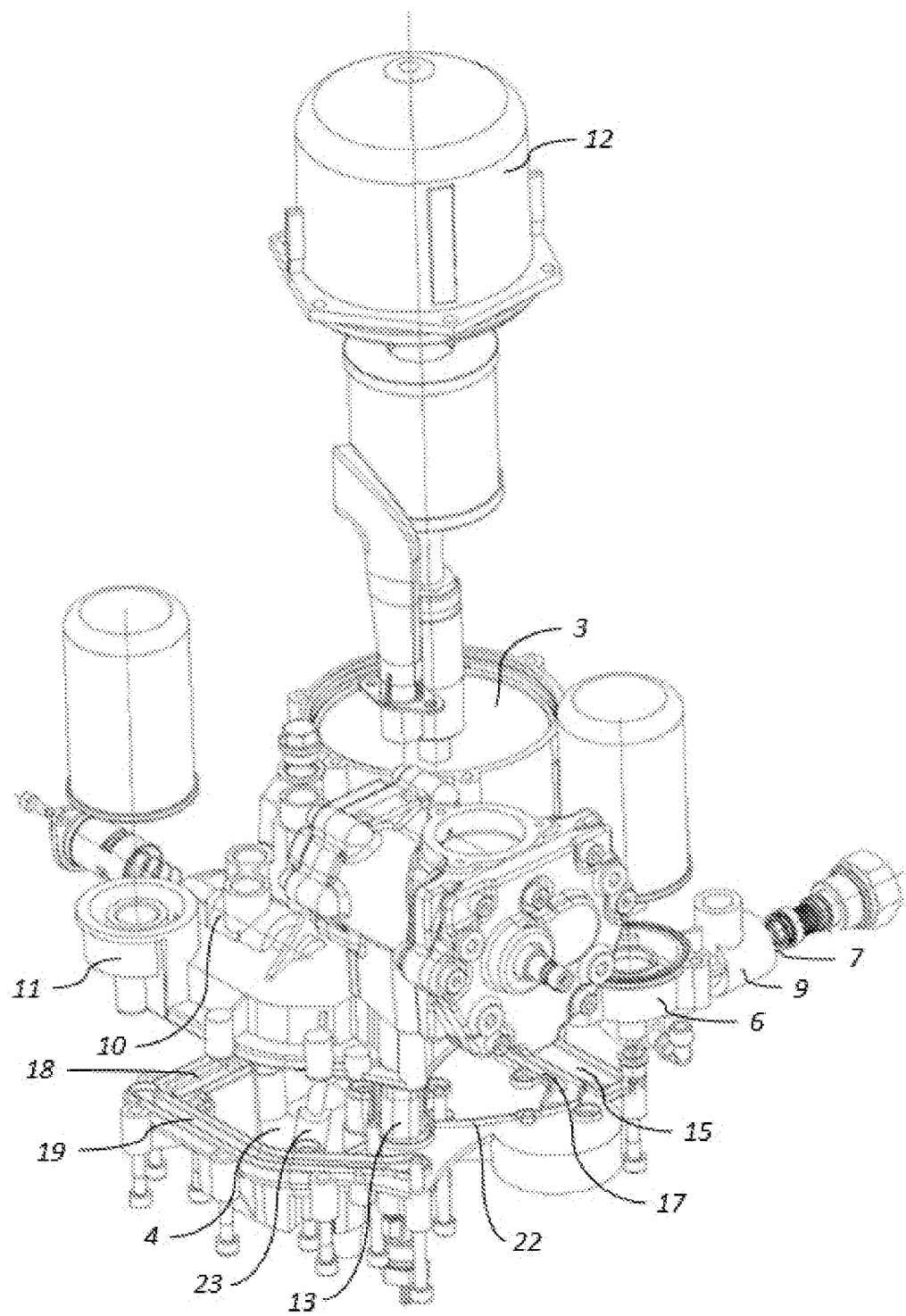
FIG. 4 shows an exploded view of all components of the housing and specific components of a compressor installation which may be connected to this housing.

FIG. 4 shows an exploded view of the housing 1 with two opposite housing pieces 1',1" and a detachable lid 12.

In addition, it is shown how several components of the compressor installation external to the housing 1 are connected and/or inserted onto respectively into the housing 1.

For instance, it becomes clear how the minimum pressure valve and the thermostatic valve may be inserted into their casing 10 respectively 11.

It is also illustrated how the external liquid separation filter and liquid filter are accommodated onto their supporting seats 6 respectively 11, and how the compressor element may be connected onto the inlet 2 and outlet of the housing 1.

Internally, the liquid separator vessel 3 may contain an internal liquid separation filter, which can be easily applied or removed by detaching the lid 12 of the liquid separator vessel 3.

Figure 5:
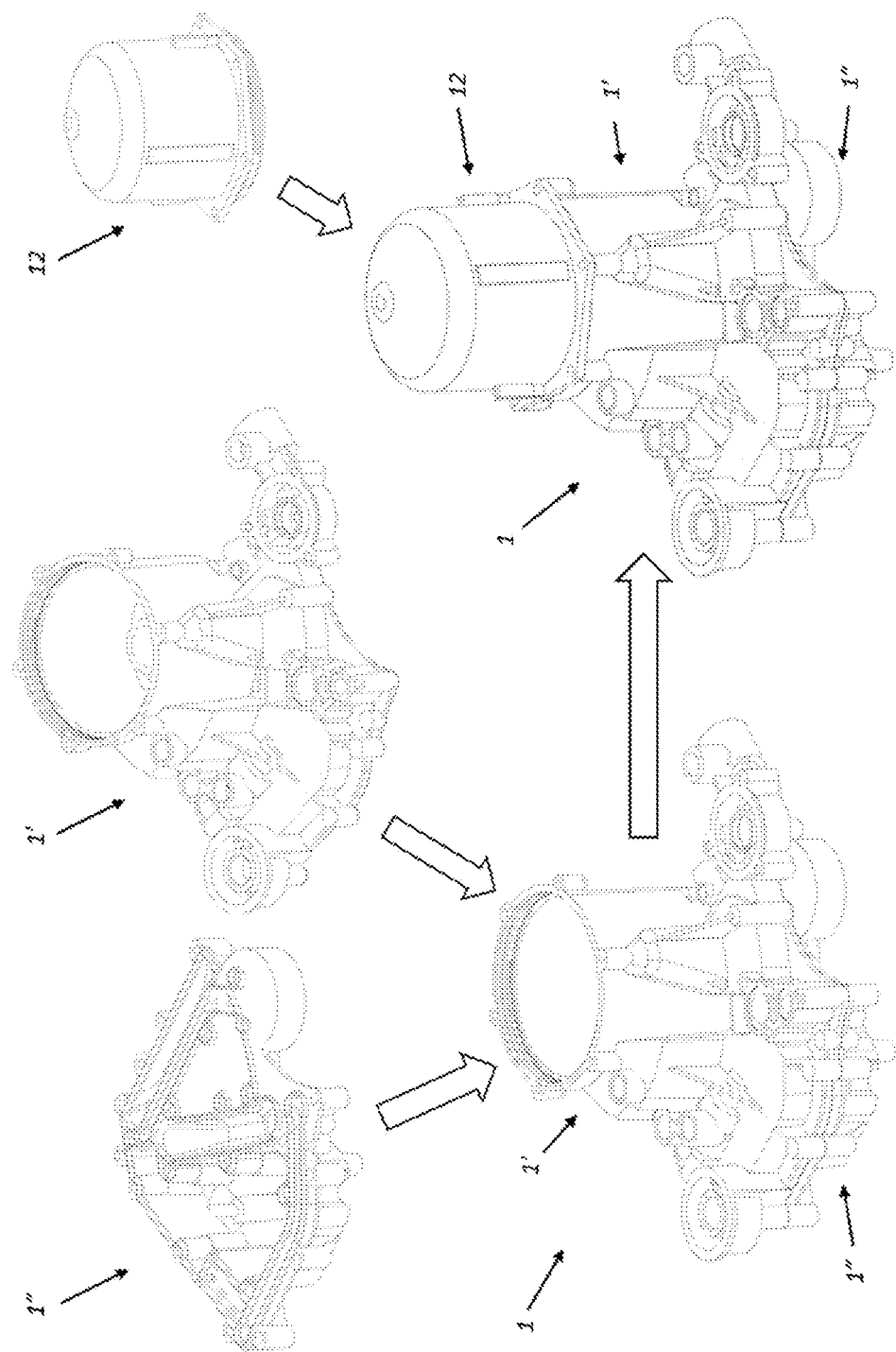
FIG. 5 shows the steps of a method to produce a housing according to the invention.

FIG. 5 shows the steps of a method to produce the housing 1 according to the invention.

In a first step of the method, the at least two opposite housing pieces 1',1" of the housing 1 are produced, whereby the housing 1 is provided with an inlet for the gas-liquid mixture, and whereby the method comprises the step of

- including a set of integrated components into the housing 1, among which a liquid separator vessel 3 configured to purify incoming gas-liquid mixture by separating liquid from the gas-liquid mixture, this liquid separator vessel 3 comprising an entry port 14 for the gas-liquid mixture, a liquid outlet port 16 for the liquid, and a gas outlet port 16 for purified gas-liquid mixture;
- including into the set of integrated components a liquid buffer tank 5, which liquid buffer tank 5 is at least partly separated from the liquid separator vessel 3 by means of a wall of the liquid separator vessel 3 in such a way that liquid in the liquid separator vessel 3 may flow in the liquid buffer tank 5 and vice versa through an opening in said wall of the liquid separator vessel 3; and
- including into the set of integrated components a set of channels, whereby a wall of each channel is part of the housing 1.

The set of channels comprises at least:
- an inlet channel 13 guiding the gas-liquid mixture from the inlet 2 of the housing 1 to the entry port 14 of the liquid separator vessel 3; and
- an outlet channel 15 guiding purified gas-liquid mixture from the gas outlet port 16 away from the liquid separator vessel 3.

In addition, the set of integrated components may comprise a liquid storage reservoir 4, a liquid buffer tank 5, a supporting seat 6 configured to accommodate an external liquid separation filter, a fitting 7 configured to connect a blow-off valve, a fitting 8 configured to connect a safety valve, a casing 9 configured to contain a minimum pressure valve, a casing 10 configured to contain a thermostatic valve, and/or a supporting seat 11 which is configured to accommodate a liquid filter configured to filter the liquid from impurities.

Furthermore, the set of channels may comprise a scavenge channel 17, a connection channel 18, and/or a drainage channel 19.

Preferably, the at least two opposite housing pieces 1',1" are produced by means of an injection moulding technique, more preferably a metal injection technique, and even more preferably an aluminium injection technique.

In a next step of the method, the at least two opposite housing pieces 1',1" are fastened together by means of bolt connection, a glue connection, or a combination of these or other kinds of connections.

As a further step of the method, the liquid separator vessel 3 is provided with a detachable lid 12.

Finally, the detachable lid 12 is fastened on the liquid separator vessel 3 by means of a bolt connection, a screw connection, or a combination of these or other kinds of connections.

The present invention is by no means limited to the embodiments described as an example and shown in the drawings, but a housing and a method to produce such a housing according to the invention can be realised in all kinds of variants without departing from the scope of the invention.

The invention claimed is:

1. A housing of a liquid separation device for separation of a liquid from a gas-liquid mixture, said housing comprising:
   an inlet for the gas-liquid mixture;
   at least two opposite housing pieces which are configured to be hermetically sealed together along a sealing line which is situated in a sealing face; and
   a set of integrated components, said set of integrated components comprising a liquid separator vessel configured to separate liquid from the gas-liquid mixture, said liquid separator vessel comprising an entry port for the gas-liquid mixture, a liquid outlet port, and a gas outlet port,
   wherein the set of integrated components further comprises a set of channels, wherein a wall of each channel is part of the housing,
   wherein the set of channels comprises an inlet channel configured to guide the gas-liquid mixture from the inlet of the housing to the entry port of the liquid separator vessel;
   and an outlet channel configured to guide gas from the gas outlet port away from the liquid separator vessel,
   wherein the set of integrated components further comprises a liquid storage reservoir, said liquid storage reservoir being configured such that it is able to store liquid leaving the liquid separator vessel through the liquid outlet port of the liquid separator vessel, and
   wherein an internal wall of the liquid storage reservoir comprises a recess configured to contain a heater.

2. The housing according to claim 1, wherein the set of integrated components further comprises a liquid buffer tank, which liquid buffer tank is at least partly separated from the liquid separator vessel by means of a wall, and which liquid buffer tank is configured such that liquid in the liquid separator vessel is able to flow in the liquid buffer tank and vice versa through an opening in said wall.

3. The housing according to claim 1, wherein the liquid separator vessel contains an internal liquid separation filter configured to further separate liquid from the gas-liquid mixture.

4. The housing according to claim 3, wherein the set of channels comprises a scavenge channel which is configured to guide liquid separated in the internal liquid separation filter away from the liquid separator vessel.

5. The housing according to claim 1, wherein the set of integrated components further comprises a supporting seat which is configured to be connected to the outlet channel and to accommodate an external liquid separation filter configured to further separate liquid from the gas-liquid mixture.

6. The housing according to claim 5, wherein the set of integrated components further comprises a fitting configured to connect a blow-off valve and wherein the fitting configured to connect the blow-off valve is provided downstream the supporting seat configured to accommodate the external liquid separation filter.

7. The housing according to claim 1, wherein the set of integrated components further comprises a fitting configured to connect a blow-off valve.

8. The housing according to claim 7, wherein the liquid separator vessel contains an internal liquid separation filter configured to further separate liquid from the gas-liquid mixture and wherein the fitting configured to connect the blow-off valve is provided downstream the internal liquid separation filter.

9. The housing according to claim 1, wherein the set of integrated components further comprises a fitting configured to connect a safety valve.

10. The housing according to claim 1, wherein the set of integrated components further comprises a casing configured to contain a minimum pressure valve.

11. The housing according to claim 1, wherein the sealing face is a plane.

12. The housing according to claim 1, wherein a channel in the set of channels is cut along the sealing face over a distance of more than 50% of a length of said channel.

13. The housing according to claim 12, wherein the sealing line is at least partly contained in the wall of the channel.

14. The housing according to claim 1, wherein at least one of the at least two opposite housing pieces is provided with a groove along the sealing line.

15. The housing according to claim 14, wherein the groove is a continuous groove.

16. The housing according to claim 14, wherein at least one of the at least two opposite housing pieces opposite to the at least one of the at least two opposite housing pieces provided with the groove, is provided with a protrusion along the sealing line, said protrusion being configured to fit into the groove.

17. The housing according to claim 1, wherein the liquid separator vessel comprises a detachable lid.

18. The housing according to claim 1, wherein a channel in the set of channels is essentially constant in diameter along a length of said channel.

19. The housing according to claim 1, wherein the liquid separator vessel comprises a concave internal surface which is cyclic symmetric.

20. The housing according to claim 19, wherein the gas outlet port of the liquid separator vessel is arranged along an axis around which the concave internal surface is cyclic symmetric.

21. The housing according to claim 1, wherein the gas outlet port and the liquid outlet port of the liquid separator vessel are arranged at a same side of the liquid separator vessel.

22. A housing of a liquid separation device for separation of a liquid from a gas-liquid mixture, said housing comprising:
   an inlet for the gas-liquid mixture;
   at least two opposite housing pieces which are configured to be hermetically sealed together along a sealing line which is situated in a sealing face; and a set of integrated components, said set of integrated components comprising a liquid separator vessel configured to separate liquid from the gas-liquid mixture, said liquid separator vessel comprising an entry port for the gas-liquid mixture, a liquid outlet port, and a gas outlet port, wherein the set of integrated components further comprises a set of channels, wherein a wall of each channel is part of the housing, wherein the set of channels comprises an inlet channel configured to guide the gas-liquid mixture from the inlet of the housing to the entry port of the liquid separator vessel; and an outlet channel configured to guide gas from the gas outlet port away from the liquid separator vessel, and wherein the set of integrated components further comprises a casing included in the housing and configured to contain a thermostatic valve.

23. The housing according to claim 1, wherein the set of integrated components further comprises a supporting seat which is configured to accommodate a liquid filter configured to filter the liquid from impurities.

24. The housing according to claim 23, wherein the set of channels comprises a drainage channel configured to drain liquid filtered from impurities in the liquid filter away from the supporting seat which is configured to accommodate the liquid filter.

25. The housing according to claim 22, wherein the set of integrated components further comprises a supporting seat which is configured to accommodate a liquid filter configured to filter the liquid from impurities and wherein the set of channels comprises a connection channel configured to connect the casing configured to contain the thermostatic valve with the supporting seat configured to accommodate the liquid filter.

* * * * *